United States Patent [19]

Kawaguchi

[11] 4,338,787

[45] Jul. 13, 1982

[54] VARIABLE RATIO BRAKE MASTER CYLINDER DEVICE

[75] Inventor: Hiroshi Kawaguchi, Mishima, Japan

[73] Assignee: Toyota Jidosha Kogyo Kabushiki Kaisha, Aichi, Japan

[21] Appl. No.: 190,746

[22] Filed: Sep. 25, 1980

[30] Foreign Application Priority Data

Oct. 3, 1979 [JP] Japan .................. 54/128139

[51] Int. Cl.³ ............................. B60T 11/20
[52] U.S. Cl. ...................... 60/562; 60/578; 60/588; 60/589
[58] Field of Search ............. 60/550, 562, 588, 589, 60/574, 578

[56] References Cited

U.S. PATENT DOCUMENTS

| | | | |
|---|---|---|---|
| 3,937,021 | 2/1976 | Sisco | 60/589 |
| 4,086,770 | 5/1978 | Shaw | 60/574 |
| 4,133,178 | 1/1979 | Brooks, Sr. | 60/589 |
| 4,152,897 | 5/1979 | Falk . | |
| 4,156,348 | 5/1979 | Brown | 60/578 |
| 4,208,881 | 6/1980 | Brademeyer | 60/578 |

*Primary Examiner*—Abraham Hershkovitz
*Attorney, Agent, or Firm*—Birch, Stewart, Kolasch & Birch

[57] ABSTRACT

The present invention relates to a brake master cylinder device including a first and a second cylinder bore formed within a body. A piston member is formed with a first piston and a second piston, which are respectively engaged with the first and the second cylinder bores to define a first and a second cylinder chamber, the arrangement being such that when the piston member is moved in a certain direction the volumes of both the first and the second cylinder chambers are reduced together. The piston member is biased in the direction opposite to said certain direction. A fluid conduit opens from the second cylinder chamber for connection to a brake actuator. A first one way valve always allows fluid to flow freely from the first to the second cylinder chamber. A second one way valve allows fluid to flow from a fluid reservoir, within which fluid is kept at atmospheric pressure, to the first cylinder chamber, when the pressure in the first cylinder chamber is below atmospheric pressure. A means is provided for venting the first cylinder chamber, which allows fluid to flow from it to the fluid reservoir, when the pressure of the fluid in the first cylinder chamber rises to a predetermined pressure value. When the first piston member is in its extreme position in said opposite direction, a means for refilling the first cylinder chamber allows fluid to flow freely from the fluid reservoir to the first cylinder chamber, and a means for releasing fluid from the second cylinder chamber allows fluid to flow therefrom to the fluid reservoir. Thus a two-stage performance of brake application is available.

6 Claims, 1 Drawing Figure

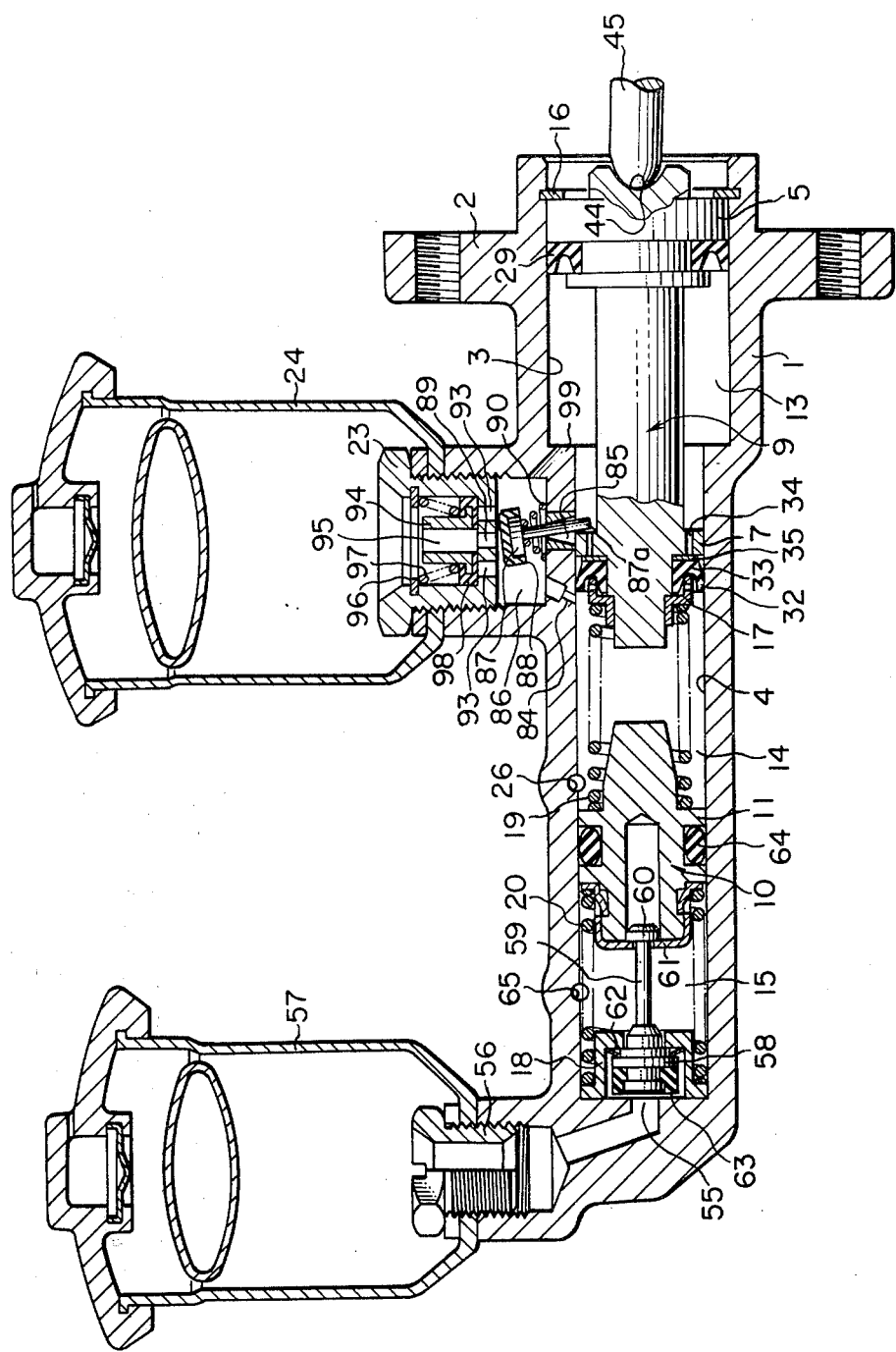

VARIABLE RATIO BRAKE MASTER CYLINDER DEVICE

BACKGROUND OF THE INVENTION

The present invention relates to a brake master cylinder device for use in vehicles such as automobiles, and, more particularly, relates to a brake master cylinder device in which the mechanical advantage obtained by the operator of the vehicle, as he presses on the brake pedal thereof in order to apply an actuating force to the braking system of the vehicle, is advantageously arranged to vary.

In many vehicles such as automobiles there are conventionally used hydraulic fluid braking systems, in which: a brake pedal or other braking member of the vehicle is depressed by the operator thereof, the force exerted on this braking member is converted by a brake master cylinder device into a hydraulic brake fluid pressure, and this hydraulic brake fluid pressure is transmitted via a conduit system to one or more fluid actuators of braking system, which act upon the road wheels of the vehicle, and in which a friction member such as a brake shoe or a brake pad is pushed by said hydraulic brake fluid pressure against a rotating member which rotates along with the road wheels of the vehicle such as a brake drum or a brake disk, in order to perform a braking action.

In such a hydraulic fluid braking system, typically, there is provided a certain clearance between the friction member such as a brake shoe or a brake pad, and the rotary member such as a brake drum or brake disk. Recently, it has become customary to provide a considerably large clearance between such a friction member and such a rotary member, from the point of view of guarding against dragging or rubbing of the brakes of the vehicle, which can greatly reduce the efficiency of operation of the vehicle, and increase the fuel consumption thereof.

In the process of application of such a braking system, there are two distince phases.

First, as the brake pedal or other braking member of the vehicle is initially moved by the operator thereof, the brake master cylinder device expels fluid into the conduit system and thence into the abovementioned hydraulic actuator or actuators, so as, initially, to take up the said clearance, by moving the friction member or members such as a brake shoe or brake pad into initial gentle contact with the rotary member or members such as a brake drum or brake disk. The hydraulic brake fluid pressure required for taking up this initial clearance is relatively low. However, the total amount of hydraulic brake fluid required to be displaced through the conduit system, for taking up this clearance, is quite large, since, as explained above, this clearance may be quite large. Therefore, in order to provide this fairly large quantity of hydraulic brake fluid through the conduit system at a fairly low pressure, without the braking actuating member of the vehicle such as a brake pedal being required to be moved through an undesirably large distance, it is desirable that the diameter of the hydraulic piston of the brake master cylinder device should be quite large, in order that, per unit amount of movement of this hydraulic piston, a comparatively large quantity of hydraulic brake fluid should be expelled from the brake master cylinder device through the conduit system. With such a large diameter brake master cylinder device, the mechanical advantage provided for the operator of the vehicle, as he presses upon the braking member thereof, is not very high.

On the other hand, in the second phase of braking operation, when the abovementioned clearance has been taken up, so that the friction member such as a brake pad or brake shoe is in gentle contact with the rotary member such as a brake disk or a brake drum, then, in order actually to perform substantial braking action to retard the motion of the vehicle, the pressing force between this friction member and this rotary member needs to be substantially increased. As this pressing force is increased, the friction member does not move very far, as compared to its amount of motion while taking up the abovementioned clearance in the first phase of operation. However, the force required to move the friction member is much greater than was required in the abovementioned first phase of operation. Thus, in this second phase of operation, not a very large quantity of hydraulic brake fluid needs to be provided through the conduit system leading to the hydraulic actuator, but this quantity needs to be made available at quite high hydraulic pressure. Accordingly, therefore, it is desirable, for this phase of operation, to employ a brake master cylinder device, the diameter of the hydraulic piston of which is quite small, so that a high mechanical advantage is obtained by the driver of the vehicle as he presses on the braking member thereof, so that a sufficiently high hydraulic brake fluid pressure may be provided to the conduit system and to the hydraulic actuator, without requiring an undue amount of pressure to be exerted by the driver on the brake member. In other words, the mechanical advantage provided by the brake master cylinder device should, in this phase, desirably be at a high level, which entails a small diameter for the hydraulic piston of the master cylinder device.

Therefore, it is seen that the requirements with regard to the diameter of a piston of a brake master cylinder device, in the abovementioned first and second stages of operation of the braking system of the vehicle, are somewhat opposed. Accordingly, therefore, in conventional designs of a brake master cylinder device, a compromise has been found between the requirement of the first phase of brake operation, which is for a large diameter of the piston of the brake master cylinder device, and the requirement of the second phase, which is for a small diameter of the piston of the brake master cylinder device. However, finding this compromise has become more difficult, according to recent developments as mentioned above, in which the initial clearance between a friction member such as a brake pad or brake shoe, and a rotary member such as a brake disk or brake drum, has been increased. This has presented a substantial difficulty with regard to current design of brake master cylinder devices.

SUMMARY OF THE INVENTION

Therefore, in order to increase the amount of hydraulic brake fluid output from a brake master cylinder device, relative to the distance of movement of a braking member of a vehicle, it is required to increase the diameter of the piston of the brake master cylinder device. However, if this piston diameter is increased too much, when the friction member of a braking system is engaged with the rotary member thereof, so as to perform a braking action, an actuating force which is too large will be required on the braking member of the vehicle, for providing a desired braking action. This will undesirably reduce the drivability of the automobile, and deteriorate the driving feel of the braking system thereof, causing, among other shortcomings, a requirement for a powerful power brake booster system.

Therefore, one of the objects of the present invention is to provide a brake master cylinder device which has a hydraulic brake fluid output amount which varies, according to the pressure at which said hydraulic brake fluid output needs to be provided.

A further object of the present invention is to provide a brake master cylinder device which provides, for a unit displacement of the piston thereof, a large hydraulic brake fluid output at a lower pressure, and then subsequently a smaller hydraulic brake fluid output at a higher pressure.

A further object of the present invention is to provide a brake master cylinder device which, in the initial stage of application of a braking system of a vehicle, provides a low mechanical advantage for the driver thereof, as he applies the braking system, and which, at a later stage in the braking operation of a vehicle, provides a higher mechanical advantage for the operator of the vehicle, as he operates the braking system thereof.

A further object of the present invention is to provide a brake master cylinder device which is capable of providing a sufficient quantity of hydraulic brake fluid, during the initial stages of brake operation, to take up a fairly large clearance in a braking system of a vehicle, while at the same time, providing, without requiring undue force to be applied to the braking member of the vehicle, a sufficiently high hydraulic brake fluid pressure to operate the braking sytem of the vehicle with sufficient force to provide a desirable good braking action therefrom.

According to the present invention, these, and other, objects are accomplished by a brake master cylinder device, comprising: (a) a body within which are formed a first cylinder bore and a second cylinder bore; (b) a first piston member, comprising a first piston engaged with said first cylinder bore and a second piston engaged with said second cylinder bore, a first cylinder chamber and a second cylinder chamber being, respectively, defined by the cooperation of said first piston with said first cylinder bore and by the cooperation of said second piston with said second cylinder bore, the displacement of said first piston member with respect to said body in a first direction tending to reduce the volume of said first cylinder chamber and also to reduce the volume of said second cylinder chamber; (c) a first means for biasing said first piston member in a direction opposite to said first direction with respect to said body; (d) a fluid reservoir for keeping fluid substantially at atmospheric pressure; (e) a fluid conduit opening from said second cylinder chamber for connection to a first brake actuator in order to supply operating fluid pressure thereto; (f) a means for venting said first cylinder chamber, which allows fluid to flow from said first cylinder chamber to said fluid reservoir when the fluid pressure in said first cylinder chamber rises to a predetermined fluid pressure value; (g) a means for refilling said first cylinder chamber, which allows fluid to flow substantially freely from said fluid reservoir to said first cylinder chamber when said first piston member is in its extreme position in said direction opposite to said first direction; (h) a first one way valve, which always allows fluid to flow substantially freely from said first cylinder chamber to said second cylinder chamber; (i) a second one way valve, which allows fluid to flow substantially freely from said fluid reservoir to said first piston chamber, when the pressure in said first cylinder chamber is below substantially atmospheric pressure; and (j) a means for releasing fluid from said second cylinder chamber, which allows fluid to flow from said second cylinder chamber to said fluid reservoir when said first piston member is in its extreme position in said direction opposite to said first direction; (k) whereby, as said first piston member is displaced in said first direction from its extreme position in said direction opposite to said first direction, as the pressure within said fluid conduit and said second cylinder chamber rises so as progressively to operate said first brake actuator more and more, until the pressure in said first cylinder chamber reaches said predetermined pressure value, said pressure in said first cylinder chamber is substantially the same as that in said second cylinder chamber, said first one way valve allowing substantially free passage of fluid from said first cylinder chamber to said second cylinder chamber; but, when the pressure in said first cylinder chamber reaches said predetermined fluid pressure value, said venting means operates, so as to vent said first cylinder chamber to said fluid reservoir, and so as thus to prevent further rise of the pressure within said first cylinder chamber, the further rise of pressure within said second cylinder chamber being unaffected by the action of said venting means, and reverse flow of fluid from said second cylinder chamber to said first cylinder chamber being definitely always prevented; (l) whereby the pressure available in said fluid conduit, for a given amount of pressure exerted on said first piston member in said first direction, is higher in the latter period of operation of said master cylinder device, after said venting means has started to vent fluid to said fluid reservoir from said first cylinder chamber, than in the former period of operation of said master cylinder device, before said venting means has started to vent fluid to said fluid reservoir from said first cylinder chamber.

According to such a structure, before the hydraulic fluid pressure in the fluid conduit, which is communicated with a brake actuator of the vehicle, increases beyond the said predetermined value, the effective diameter of the piston of the brake master cylinder device is increased by the aforesaid reduction in size of the first chamber, according to the movement of the first piston member, and, accordingly, relative to a unit amount of movement of the brake pedal of the vehicle, which is coupled to the motion of the piston member, a large amount of hydraulic fluid, at a low pressure, is expelled through the fluid conduit. This supply of hydraulic fluid occurs by the hydraulic fluid compressed within the first cylinder chamber, due to its reduction in volume, being driven through the first one way valve and through the second cylinder chamber into the fluid conduit. On the other hand, when the pressure required to be supplied by the brake master cylinder device exceeds said predetermined pressure value, then the venting means commences to vent the first cylinder chamber to the fluid reservoir, so that only the second cylinder chamber provides supply of hydraulic fluid to the fluid conduit and to the braking system of the vehicle, and so that the effective diameter of the piston of the brake master cylinder device is the diameter of the second cylinder chamber. At this time, of course, the first one way valve prevents reverse flow of fluid from the second cylinder chamber back to the first cylinder chamber. Thus, greater mechanical advantage is available for the driver of the vehicle. Fluid which is contained within the first cylinder chamber, thereafter, as the first cylinder chamber is further reduced in volume by the movement of the first piston therein, continues to be vented to the fluid reservoir. Thereby, the abovementioned desirable two stage performance of brake master cylinder device is available, because in the first stage of operation, when the pressure in the first cylinder chamber is lower than said predetermined pressure value, a relatively large amount of hydraulic fluid is provided at a low pressure, per unit displacement of the piston member, thus ensuring that the abovementioned clearance is quickly taken up, while in the second stage of operation, when the pressure required to be provided is greater than said predetermined pressure value, then only a relatively small amount of hydraulic fluid is provided, per unit displacement of the piston member. Consequently, during the phase of actual operation of the braking system of the vehicle to slow the vehicle, a good mechanical advantage is obtained by the driver thereof, as he depresses the braking member such as a brake pedal of the vehicle. This provides a desirable drivability for the automobile, and a good braking feeling therefor.

Further, when the driver of the vehicle allows the brake pedal to return, so as to release application of the braking system of the vehicle, then the first piston member moves in the direction opposite to said first direction, and very quickly the fluid pressure within the first cylinder chamber drops below said predetermined pressure value, and shortly thereafter becomes negative with respect to atmospheric pressure, i.e. drops to lower than the pressure within the fluid reservoir. At this time, therefore, the second one way valve allows fluid to flow substantially freely from said fluid reservoir to said first cylinder chamber, so as to refill it.

Further, when said first piston member has completely returned to its extreme position in said direction opposite to said first direction, then said refilling means allows fluid to flow substantially freely from said fluid reservoir into said first cylinder chamber, so as to ensure that said first cylinder chamber is completely refilled, and that no slight under pressure remains therein. This is in order to ensure that the first cylinder chamber is definitely completely refilled before further application of the braking system of the vehicle by the driver thereof. On the other hand, simultaneously, said second cylinder chamber pressure releasing means allows fluid to flow from said second cylinder chamber and said fluid conduit connected therewith into said reservoir, said fluid corresponding to the fluid which was transferred from said first cylinder chamber to said second cylinder chamber during the reduction of the volume of said first cylinder chamber when said first piston member was moved in said first direction. This is in order to definitely completely return said first brake actuator to its release position.

BRIEF DESCRIPTION OF THE DRAWING

The present invention will become more fully understood from the following description of some preferred embodiments thereof, which is to be taken in conjunction with the accompanying drawings. It should be clearly understood, however, that the description of the embodiments, and the drawings, are all provided purely for the purposes of illustration and exemplification only, and are in no way to be taken as limitative of the scope of the present invention. In the drawing, the sole FIGURE is a vertical cross sectional view taken along the axis of a brake master cylinder device, which is a preferred embodiment of the present invention, and which is a tandem type master cylinder device.

DESCRIPTION OF THE PREFERRED EMBODIMENT

The present invention will be described with reference to a preferred embodiment thereof, and with reference to the accompanying drawing.

Referring to the FIGURE, in this preferred embodiment, the present invention is applied to a brake master cylinder device which is a tandem master cylinder. However, this is not essential to the present invention, which, equally, could be applied to a single type brake master cylinder device.

In the following description, the terms "left", "right", "up", "down", etc., will be used freely. However, this is not intended to be limitative of the present invention, but is only with reference to the illustrative drawing shown, for convenience of explanation.

In the FIGURE, the brake master cylinder device therein shown comprises a master cylinder body member 1, at the right hand end of which is provided a fixing flanged portion 2 for mounting it to an appropriate part of a vehicle, not shown. Within the body member 1 there are bored a large diameter cylinder bore 3 generally on the right hand side thereof, and a small diameter cylinder bore 4 generally on the left hand side thereof. The large cylinder bore 3 and the small cylinder bore 4 are coaxial, and communicate with one another. The diameter of the small cylinder bore 4 is substantially smaller than the diameter of the large cylinder bore 3. The large cylinder bore 3 is open to its right hand end, whereas the small cylinder bore 4 is closed at its left hand end by a part of the body member 1.

Within the body member 1, there is provided a first piston member 9, which extends into both the large cylinder bore 3 and into the small cylinder bore 4, which is formed with a large diameter piston land portion 5 which is engaged with the large cylinder bore 3, and which is further formed with a small diameter piston land portion 7 which is engaged with the small cylinder bore 4. These two land portions are axially spaced along the axis of the first piston member 9. Further, provided within the body member 1, received in the small cylinder bore 4, there is a second piston member 10, which is formed with a pair of second piston member lands 11 which engage with the inner surface of the small cylinder bore 4. Both the first and second piston members 9 and 10 are axially slidable in the body member 1, i.e., along the axis of the large cylinder bore 3 and the small cylinder bore 4, leftwards and rightwards in the FIGURE.

The travel of the first piston member 9 is restricted in its rightwards direction by a retaining snap ring 16 which is mounted in a circumferential slot cut in the right end of the inner surface of the large cylinder bore 3, and is restricted in its leftwards direction by a part of the large piston land portion 5 coming into abutting contact with the step in the interior of the body member 1 formed between the large cylinder bore 3 and the small cylinder bore 4. The travel of the second piston member 10 in its axial direction to the left is restricted by its coming into contact, via a second piston member cap element 61 and an end cap shaped element 18 which will be described later, with the part of the body member 1 which closes the left hand end of the small cylinder bore 4, and the travel of the second piston member 10 is restricted in its axial direction to the right by coming into contact with the left hand end of the first piston member 9.

Thus, a first fluid chamber 13 is defined between the large piston land portion 5 and the small piston land portion 7 of the first piston member 9, in cooperation with the large cylinder bore 3 and the small cylinder bore 4; a second fluid chamber 14 is defined between the small piston land portion 7 of the first piston member 9 and the second piston member lands 11 of the second piston member 10, in cooperation with the small cylinder bore 4; and a third fluid chamber 15 is defined between the second piston member lands 11 of the second piston member 10 and the left hand portion of the body member 1, in cooperation with the small cylinder bore 4. These three chambers are arranged in the order of their reference numerals from the right to the left of the drawing.

On the left hand end of the first piston member 9 there is mounted a first piston member cap element 17, and the right hand end of the second piston member 10 is formed as a protuberance or projection. Between this protuberance or projection, and this first piston member cap element 17, there is mounted a first compression coil spring 19. At the left hand end of the small cylinder bore 4, against the left hand portion of the body member 1, there is placed the bore end cap shaped element 18, and on the right hand end of the second piston member 10 there is mounted the second piston member cap element 61. Between the bore end cap shaped element 18 and this second piston member cap element 61, there is mounted a second compression coil spring 20.

Thus, when no force is exerted, for example via a foot brake pedal of the vehicle which is adapted to be pressed by the driver, on the first piston member 9 to push it leftwards in the drawing, then, by the biasing actions of the first compression coil spring 19 and the second compression coil spring 20, the first piston member 9 is moved to its right hand position as shown in the drawing where its right hand end abuts against the retaining snap ring 16, and furthermore the second piston member 10 is moved to an intermediate position in the small cylinder bore 4, i.e., to an axial position which is determined by the balance of the spring forces of the first compression coil spring 19 and the second compression coil spring 20. These positions of the first piston member 9 and the second piston member 10 will be henceforth referred to as their restored or equilibrium positions.

Around a groove in the second piston member 10 formed between the two second piston member lands 11, there is mounted a sealing O-ring 64 which is formed of a rubber like elastomeric material. This provides a two way seal between the second fluid chamber 14 and the third fluid chamber 15.

To the left hand side of the small piston land portion 7 of the first piston member 9 there is mounted a first seal element 33, also made of a rubber like elastomeric material, which is formed with a sealing lip flange 32 facing to the left in the drawing. Thus, by its cooperation with the inner surface of the small cylinder bore 4, this first seal element 33 functions as a one way fluid valve, allowing hydraulic brake fluid only to flow from the first fluid chamber 13 to the second fluid chamber 14, and not in the reverse direction, through a plurality of first fluid flow holes 34 pierced through the small piston land portion 7, and past a first thrust washer 35, which is mounted between the first seal element 33 and the small piston land portion 7, and which has a certain clearance provided between it and the inner wall of the small cylinder bore 4. This fluid flow therethrough passes from the first fluid chamber 13, through the first fluid flow holes 34, under, past, and around the first thrust washer 35, and past the sealing lip flange 32 of the first seal element 33 into the second fluid chamber 14.

Further, just to the left of the large piston land portion 5 of the first piston member 9, there is mounted a second seal element 29, also made of a rubber like elastomeric material, which functions as a seal, preventing the escape of hydraulic brake fluid out from the first fluid chamber 13 to the right hand direction in the drawing.

The members, i.e., the sealing O-ring 64, the first seal element 33, and the second seal element 29, therefore support the second piston member 10 within the small cylinder bore 4 so as to slide therein, and also support the first piston member 9 in the small cylinder bore 4 and the large cylinder bore 3, so as to slide therein.

On the upper part of the right hand side of the body member 1 there is mounted a first hydraulic brake fluid reservoir 24, via a first mounting cup shaped nut member 23 screwed between it and the body member 1, and under this cup shaped nut member 23 there is defined a brake fluid chamber 86. In the body of the body member 1, between the brake fluid chamber 86 and the interior of the small cylinder bore 4, there are pierced three apertures: a first equalization port 99, which is communicated to the first fluid chamber 13 at all times when the first piston member 9 moves throughout its range of axial movement within the large cylinder bore 3 and the small cylinder bore 4; a first replenishing port 84, which is communicated to the second fluid chamber 14, substantially, only when the first piston member 9 is at the extreme right hand end of its range of movement within the large cylinder bore 3 and the small cylinder bore 4, as shown in the drawing, and communication of which to the second fluid chamber 14 is otherwise interrupted; and an opening 85, through which protrudes a valve rod 87a.

The lower end of the valve rod 87a projects within the first cylinder chamber 13, at such an axial position therein that when, as seen in the drawing, the first piston member 9 is at the extreme right hand end of its range of movement within the large cylinder bore 3 and the small cylinder bore 4, the right hand side of the small piston land portion 7 contacts the end portion of said valve rod 87a and drives it slightly to the right in the drawing. The upper end of the valve rod 87a is connected to the center of a valve member 87, on the upper side of which there is mounted a seal element 88. The valve element 87 and the valve rod 87a connected thereto are impelled upwards in the drawing by a conical compression coil spring 70, so that the seal element 88 is pressed against the end of a central fluid channel 89 formed through the center of the bottom of the cup shaped nut member 23.

Accordingly, when the first piston member 7 is not at its extreme position to the right in the large cylinder bore 3 and the small cylinder bore 4, then its small piston land portion 7 does not deflect the end of the valve rod 87a, and accordingly the valve element 87 and the seal element 88 mounted thereon are squarely pressed by the conical compression coil spring 70 upwards against the end of the central fluid channel 89, and in this condition the assembly functions as a one way valve, allowing fluid to pass relatively freely from the first hydraulic brake fluid reservoir 24, through a central bore 95 of a valve element 94 which will be described hereinafter, through the central fluid channel 89 of the cup shaped nut member 23, past the valve member 87 which is deflected slightly thereby, into the brake fluid chamber 86, and through the first equalization port 99 and the aperture 85 into the first cylinder chamber 13. In accordance with this, in order that the flow resistance of this fluid path should be low, the compression force of the conical compression coil spring 70 is arranged to be rather low, compared to the force exerted by atmospheric pressure on the area of the end of the central fluid channel 89, and accordingly, whenever the fluid pressure within the first cylinder chamber 13 and the brake fluid chamber 86 drops substantially below atmospheric, the one way valve incorporating the valve member 87, etc., functions so as to refill the first cylinder chamber 13 with brake fluid from the fluid reservoir 24 and so as to raise its pressure to atmospheric. On the other hand, if the pressure within the first cylinder chamber 13 and the brake fluid chamber 86 rises to be higher than the atmospheric pressure present in the fluid reservoir 24, then this pressure pushes the valve element 87 tightly against the end of the central fluid channel 89, and blocks the fluid channel 89.

Further, when on the other hand the first piston member 7 is in its extreme right hand position within the large cylinder bore 3 and the small cylinder bore 4, as seen in the figure, then the displacement to the right in the figure of the end of the valve rod 87a by the small piston land portion 7 tilts the valve element 87 sideways somewhat with respect to the end of the central fluid channel 89, so as positively to stop the blocking of the end of the central fluid channel 89 by this valve member 87, irrespective of the pressures in the brake fluid chamber 86 and the fluid reservoir 24. Thus, in this condition, free communication is established between the first cylinder chamber 13 and the fluid reservoir 24, as well as between the second cylinder chamber 14 and the fluid reservoir 24, in both directions.

Further, in parallel with this one way valve which comprises the valve member 87, there is provided a pressure relief valve for relieving the pressure within the first cylinder chamber 13, which will now be explained. Within the cup shaped nut member 23, above its bottom in the drawing, there is provided a valve element 94 formed as a tube with a central bore 95, which has been previously mentioned, and which communicates the brake fluid in the interior of the fluid reservoir 24 with the central fluid channel 89 bored through the bottom of the cup shaped nut member 23, at all times. Further, in the bottom of the cup shaped nut member 23 there are bored a plurality of side fluid channels 93, two of which are visible in the drawing, and which are offset from the center of the bottom of the cup shaped nut member 23. The upper ends of these side fluid channels 93 are blocked, in the condition of the apparatus shown in the figure, by an annular seal member 98 which is mounted on the bottom end of the valve element 94, and which together with the valve element 94, is biased downwards in the figure by a conical compression coil spring 97, the upper end of which bears against a snap ring 96 which is fitted within the upper portion of the cup shaped nut member 23.

The conical compression coil spring 97 is arranged to be quite powerful, so that it holds the seal member 98 mounted on the valve element 94 against the upper ends of the side fluid channels 93 in the cup shaped nut member 23, against pressure in the first cylinder chamber 13 and the brake fluid chamber 86, until this pressure reaches a certain predetermined pressure value. However, after the pressure within the first cylinder chamber 13 and the brake fluid chamber 86 reaches this certain predetermined pressure value, then it pushes the valve element 94 upwards in the drawing, against the biasing action of the conical compression coil spring 97 which is overcome, and thereby the first cylinder chamber 13 and the brake fluid chamber 86 are vented to the fluid reservoir 24, and the further rise of fluid pressure within these chambers is restricted.

Further, in the body member 1 there is provided a first hydraulic brake fluid output port 26, which is open to the second fluid chamber 14 at all times during the travel of the first piston member 9 and the second piston member 10 along their ranges of movement within the large cylinder bore 3 and the small cylinder bore 4, and which is communicated to a braking device of the vehicle, for example, to a fluid pressure actuator of a rear braking system of the vehicle, via conduits which are not shown in the figure. Further, the body member 1 is formed with a second hydraulic brake fluid output port 65, which is communicated to the third fluid chamber 15 at all times, as the second piston member 10 moves along its range of travel in the small cylinder bore 4. This second output port 65 is communicated, via conduits which are not shown, to another braking device of the vehicle, for example, to a fluid actuator of a front braking system of the vehicle.

Further, on the left hand end of the body member 1 there is formed a second replenishing port 55, which is open to the left hand end of the third fluid chamber 15, and which leads to a hole pierced through a second mounting nut 56. This second mounting nut 56 is provided as coupling a second hydraulic brake fluid reservoir 57 to the body member 1, so as to communicate hydraulic brake fluid therein to the second replenishing port 55.

The first piston member 9 is formed on its right hand end with a hemispherical depression 44 which is adapted to receive the left hand end of an actuating plunger 45. This actuating plunger 45 is connected to, for example, a brake pedal of the vehicle, adapted to be operated by the foot of the operator, so as to drive the first piston member 9 leftwards in the drawing when the brake pedal is depressed.

The second replenishing port 55, which, as explained above, opens to the left hand end of the third fluid chamber 15, is selectively opened and closed by a valve 58 which is provided within the bore end cap shaped element 18 which, as previously explained, is mounted at the left hand end of the small cylinder bore 4 formed in the body member 1. The valve 58 is constructed as comprising a valve rod 59 which is formed at its right hand end with a valve rod stop 60 which can engage with the inner side of the second piston member cap element 61 which, as previously explained, is mounted on the left hand end of the second piston member 10. A valve seal element 63, made of a rubber like elastomeric material, is mounted on the valve 58, so as to provide sealing action for the second replenishing port 55. The valve 58 is so constructed that, when the second piston member 10 is in it restored or equilibrium position as shown in the drawing, then the valve 58 provides communication between the second replenishing port 55 and the third fluid chamber 15. However, when the second piston member 10 and the second piston member cap element 61 mounted thereon start to move in the left hand direction within the small cylinder bore 4 of the body member 1, then the second piston member cap element 61 releases the valve rod stop 60 so that the valve rod 59 of the valve 58 is allowed to move slightly to the left in the direction, so as to positively close the valve 58, and thereby to interrupt communication between the second replenishing port 55 and the third fluid chamber 15. A valve compression disk spring 62 is provided between the valve 58 and the inner side of the bore end cap shaped element 18, so as to bias the valve 58 in this closing direction to close the port 55.

The operation of the brake master cylinder device explained above according to the present invention may be summarized as follows.

When the brake pedal of the vehicle is not depressed, then the actuating plunger 45 provides no biasing action to the first piston member 9 in the left hand direction in the drawing, and, therefore, the first piston member 9 and the second piston member 10 are in their restored positions as shown in the drawing, and the first fluid chamber 13 is connected, via the first equalization port 99, the brake fluid chamber 86, past the valve element 87, which is somewhat tilted sideways away from the end of the central fluid channel 89 in the bottom of the cup shaped nut member 23, by the displacement slightly to the right in the drawing of the lower end of the valve rod 87a by the small piston land portion 7, so as to open this central fluid channel 89, and via the central bore 95 formed through the valve element 94, to the hydraulic brake fluid in the interior of the first hydraulic brake fluid reservoir 24, and is substantially at atmospheric pressure; the second fluid chamber 14 is communicated, via the first replenishing port 84 and the brake fluid chamber 86, etc., to the hydraulic brake fluid in the interior of the first hydraulic brake fluid reservoir 24, and is also at substantially atmospheric pressure; the second fluid chamber 15 is communicated, via the valve 58 and the second replenishing port 55 and the hole in the second mounting nut 56, to the hydraulic brake fluid stored in the second hydraulic brake fluid reservoir 57, and is also substantially at atmospheric pressure.

Now, when the brake pedal of the vehicle is depressed by the foot of an operator, the actuating plunger 45 moves to the left in the drawing, thereby pressing the first piston member 9 to the left in the drawing. Almost immediately, as soon as the first piston member 9 moves, the communication between the first replenishing port 84 and the second fluid chamber 14 is interrupted, by the sealing lip flange 32 of the first seal element 33 passing the end of this first replenishing port 84, where it opens in the small cylinder bore 4. Further, the small piston land 7 of the first piston member 9 moves to the left in the drawing, and ceases to impel the lower end of the valve rod 87a to the right, whereby now, as previously explained, the conical compression coil spring 70 is able to impel the valve member 87 and the seal element 88 thereon against the end of the central fluid channel 89 formed in the cup shaped nut member 23, so that this assembly functions as a one way valve, allowing fluid flow from the fluid reservoir 24 to the brake fluid chamber 86 and the first cylinder chamber 13, but not in the reverse direction. Further, as the first piston member 9 moves to the left in the large cylinder bore 3 and the small cylinder bore 4, against the biasing spring force of the first compression coil spring 19 and the second compression coil spring 20, then, because of the difference in the diameters of the large cylinder bore 3 and the small cylinder bore 4, and because of the associated difference in the cross sectional areas thereof, the volume of the first fluid chamber 13 will progressively decrease. The hydraulic brake fluid within the first fluid chamber 13 cannot escape through the first equalization port and the brake fluid chamber 86 back to the first hydraulic brake fluid reservoir 24, because the communication of the hydraulic brake fluid chamber 86 to the fluid reservoir 24 is interrupted by the one way valve comprising the valve member 87, etc., as explained above, and because as yet the pressure within the first cylinder chamber 13 and the brake fluid chamber 86 is assumed not to have reached the abovementioned predetermined pressure value at which venting thereof to the fluid reservoir 24, via the side fluid channels 93 formed in the cup shaped nut member 23, and past the valve element 94, occurs; and accordingly this hydraulic brake fluid compressed within the first cylinder chamber 13 is forced through the fluid flow holes 34 formed in the small piston land portion 7, past the first thrust washer 35, and past the sealing lip flange 32 of the first seal element 33, into the second fluid chamber 14.

Further, as soon as the second piston member 10 has moved a little to the left in the drawing, the valve rod stop 60 is released from engagement with the second piston member cap element 61, as explained above, and the valve rod 59 moves a little to the left in the drawing, thereby closing the valve 58 and interrupting communication between the second replenishing port 55 and the third fluid chamber 15. Thus, as the first piston member 9 and the second piston member 10 both move further to the left in the drawing, the second piston member 10 being balanced between the hydraulic fluid pressures in the second fluid chamber 14 and the third fluid chamber 15, and between the spring actions of the first compression coil spring 19 and the second compression coil spring 20, the hydraulic brake fluid within the second fluid chamber 14 will be driven out through the first output conduit 26, and the hydraulic brake fluid within the third fluid chamber 15 will be driven out through the second output conduit 65, so as to operate the respective hydraulic fluid pressure actuated brake systems connected to this first output conduit 26 and to this second output conduit 65, in a balanced manner.

It should be particularly noted that, according to the present invention, the amount of hydraulic brake fluid that is expelled from the combination of the first fluid chamber 13 and the second fluid chamber 14 through the first output conduit 26 to operate the particular hydraulic brake fluid pressure actuated braking system coupled to this first output conduit 26, such as the rear braking system of the vehicle, at this time, is governed by the square of the internal diameter of the large cylinder bore 3, and is not related to the internal diameter of the small cylinder bore 4, and this hydraulic brake fluid is accordingly provided in a relatively large amount, per unit amount of travel of the first piston member 9. Thus, the braking system coupled to the first output conduit 26 is actuated in a relatively quick fashion by this large amount of hydraulic brake fluid supplied thereto. In accordance with this operation, relative to the amount of pressure applied by the foot of the driver to the braking pedal of the vehicle, i.e., relative to the amount of pressure exerted by the actuating plunger 45 on the right hand end of the first piston member 9, the pressure of the hydraulic brake fluid expelled through the first output port 26 to the hydraulic brake fluid pressure actuated braking system connected thereto is relatively low. However, in the initial stages of taking up the slack in this braking system, this will be quite acceptable.

In a per se well known fashion, the hydraulic brake fluid expelled from the third fluid chamber 15 through the second output port 65 is sent to the other hydraulic fluid pressure operated braking system connected to this second output port 65, for example, to the front braking system of the vehicle. The arrangements for supplying fluid pressure from the second hydraulic brake fluid reservoir 57, via the second replenishing port 55 and the third fluid chamber 15, and via the second output port 65, to this front braking system, as controlled by the second piston member 10, do not practice the present invention; they are per se well known and conventional. Thus, over the entire stroke of the second piston member 10 within the small cylinder bore 4, the amount of hydraulic brake fluid expelled from the third fluid chamber 15 through the second output port 65 to the braking system associated therewith is substantially constant, per unit amount of displacement of the second piston member 10.

As explained above, during this first phase of the motion of the first piston member 9 within the body member 1 to the left, the deciding factor with regard to the amount of hydraulic brake fluid expelled through the first output port 26 to the rear braking system of the vehicle, per unit amount of movement of the first piston member 9, is the square of the internal diameter of the large cylinder bore 3, and accordingly a proportionally large amount of hydraulic brake fluid will be expelled through the first output port 26, in relation to the amount of movement of the first piston member 9. This is because the first fluid chamber 13 is in communication with the first fluid chamber 14, past the sealing lip flange 32 of the first seal element 33, as explained above.

However, when the hydraulic braking system connected to the first hydraulic brake fluid output port 26 engages, so as to apply more and more pressure to a braking element such as a brake pad or a brake shoe, then the pressure in the second fluid chamber 14, and the first fluid chamber 13 communicated therewith, will start to rise substantially. As more pressure is applied by the foot of the driver of the vehicle to the brake pedal thereof, and more pressure is applied by the actuating plunger 45 to the right hand end of the first piston member 9, therefore, the hydraulic brake fluid pressure within the first fluid chamber 13 and the second fluid chamber 14 will continue to rise substantially. When this hydraulic brake fluid pressure reaches said certain predetermined pressure value, which is determined by the strength of the conical compression coil spring 97, and the size and number of the side fluid channels 93, then this pressure will push the valve element 94 upwards in the drawing, overcoming the spring force of the conical compression coil spring 97, so as to open the ends of these side fluid channels 93, and hence the first cylinder chamber 13 will be vented, via the first equalization port 99, the brake fluid chamber 86, the side fluid channels 93, and past the seal member 98 mounted on the valve element 94, to the interior of the brake fluid reservoir 24, and accordingly, from this condition, as the first piston member 9 is displaced further to the left within the large cylinder bore 3 and the small cylinder bore 4 by further increase of pressure of the foot of the operator of the vehicle upon the brake pedal thereof, the hydraulic brake fluid pressure within the first fluid chamber 13 does not substantially increase further, because the diminution in the volume of the first fluid chamber 13, caused by the difference in the diameters of the large cylinder bore 3 and the small cylinder bore 4, and the associated difference in the cross sectional areas thereof, drives hydraulic brake fluid out of the second fluid chamber 13, through the aforementioned venting system, to be stored in the fluid reservoir 24. Thereby, further compression of hydraulic brake fluid within the diminishing volume of the first fluid chamber 13 is prevented, by the accomodation of this excess hydraulic brake fluid within the brake fluid reservoir 24.

Because the action of the sealing lip flange 32 of the first seal element 33 allows only flow of fluid from the first fluid chamber 13 to the second fluid chamber 14, because a pressure difference tending to cause such flow presses said sealing lip flange 32 away from the wall of the small cylinder bore 4, and does not permit fluid to flow in reverse fashion from the second fluid chamber 14 to the first fluid chamber 13, because any pressure difference tending to cause such reverse flow urges the sealing lip flange 32 against the wall of the small cylinder bore 4 so as to seal therebetween, thereby the reverse flow of fluid from the second cylinder chamber 14 to the first cylinder chamber 13 is positively prevented, and, accordingly, the second fluid chamber 14 is now functioning as a brake master cylinder chamber on its own, without reference to the first fluid chamber 13, and, as the volume of this second fluid chamber 14 is decreased by the differential movement between the first piston member 9 and the second piston member 10, hydraulic brake fluid continues to be expelled through the first output conduit 26 to the rear braking system associated with this first output conduit 26, in an amount, relative to the differential motion between the first piston member 9 and the second piston member 10, which is determined by the square of the diameter of the small cylinder bore 4 formed in the body member 1, and by its associated cross sectional area, without any reference to the diameter of the large cylinder bore 3. Because the diameter of this small cylinder bore 4 is substantially smaller than the diameter of the large cylinder bore 3, the amount of hydraulic brake fluid expelled through the first output port 26, per unit amount of displacement of the first piston member 9 within the large cylinder bore 3 and the small cylinder bore 4, is substantially smaller than was previously the case, when the venting valve comprising the valve element 94, the conical compression coil spring 97, etc., was closed. Accordingly, the mechanical advantage obtained by the brake master cylinder device according to the present invention is greater in this operational condition, and less force is required to be exerted by the driver of the vehicle upon the brake pedal thereof, than would be the case in a prior art master cylinder device, in order to operate the rear brakes of the vehicle.

If we designate the force required to move the first piston member 9 in the left hand direction as F, the pressure receiving area of the large piston land portion 5 of the first piston member 9 as $A_1$, the pressure receiving area of the small piston land portion 7 of the first piston member 9 as $A_2$, the fluid pressure in the first fluid chamber 13 as $P_1$, the fluid pressure in the second fluid chamber 14 as $P_2$, and the spring forces of the first compression coil spring 19 as f, then the force F may be derived from the following equation:

$$F = P_1(A_1 - A_2) + P_2 A_2 + f$$

Therefore, since the rise in the hydraulic brake fluid pressure $P_1$ within the first fluid chamber 13 is restricted, and does not increase substantially, beyond the pressure at which the venting valve comprising the valve element 94, the conical compression coil spring 97, etc., opens, and since the pressure receiving area $A_2$ of the small piston land portion 7, which compresses fluid in the final stage of brake operation wherein almost all of the mechanical clearance in the brake system has been cancelled and no more fluid is required, may be very small, even when the rise in the hydraulic brake fluid pressure $P_2$ within the second fluid chamber 14 is much greater than is the rise in this pressure $P_1$, the force F required for this operation remains small, as compared to what it would be in a prior art brake master cylinder system. Accordingly, the first piston member 9, as it is driven further to the left from the position at which the pressure in the first pressure chamber 13 rises to the aforementioned predetermined critical pressure value at which the venting valve comprising the valve element 94, etc., opens, does not require very much force for being driven.

Thus, fluid pressure is supplied to the front braking system connected to the second output port 65 and to the rear braking system connected to the first output port 26. When it is desired to relieve this braking action, then the driver of the vehicle removes his foot from the brake pedal thereof, and, accordingly, the actuating plunger 45 ceases to exert pressure on the first piston member 9, and, accordingly, under the restoring spring forces of the first compression coil spring 19 and the second compression coil spring 20, the first piston member 9 and the second piston member 10 start to move towards their restored or equilibrium positions. Thereby, hydraulic brake fluid flows from the front braking system of the vehicle through the conduits connected thereto, through the second output port 65, and into the third fluid chamber 15, and hydraulic brake fluid flows from the rear braking system of the vehicle, through the conduits connected thereto, through the first output port 26, and into the second fluid chamber 14. Further, at this time, as the first piston member 9 moves to the right within the large cylinder bore 3 and the small cylinder bore 4, as the first cylinder chamber 13 increases in volume, the pressure therein will drop to be lower than said predetermined critical pressure value at which the venting valve comprising the valve element 94, the conical compression coil spring 97, etc., opens, and accordingly this venting valve closes. Shortly thereafter, according to continued increase of the volume of the first cylinder chamber 13, the pressure within said first cylinder chamber 13 and the brake fluid chamber 86 becomes lower than atmospheric, and at this time the one way valve, above described, comprising the valve member 87 and the conical compression coil spring 70, etc., opens, so as to supply additional brake fluid from the fluid reservoir 24, via the central bore 95 formed in the valve element 94, via the central fluid channel 89 formed in the bottom of the cup shaped nut member 23, and past said one way valve, to refill the first cylinder chamber 13.

As an overall result of this, the braking effect applied to the rear braking system of the vehicle is smoothly relieved. Further, in a per se conventional fashion, when the first piston member 9 finally reaches its rightmost position within the large cylinder bore 3 and the small cylinder bore 4, the first replenishing port 84 is communicated with the second fluid chamber 14, and, further, the small piston land portion 7 displaces the lower end of the valve rod 87a to the right in the drawing, and thereby, as explained above, opens the valve comprising the valve member 87, etc., so as to allow free two way communication between the first cylinder chamber 13, the second cylinder chamber 14, and the interior of the fluid reservoir 24, via this valve. Therefore, the fluid in the second cylinder chamber 14 and the fluid conduit connected to the port 26 flows through the first replenishing port 84, the brake fluid chamber 86, and the one way valve comprising the valve member 87, etc., which is now compulsorily opened, to the fluid reservoir 24, as the hydraulic brake actuator (not shown in the figure) is restored by the return spring thereof (also not shown in the figure), this flow of fluid corresponding to the flow of fluid which was transferred from the first cylinder chamber 13 to the second cylinder chamber 14 when the piston 9 was driven to the left before the pressure of fluid in the first cylinder chamber 13 reached said predetermined pressure value. On the other hand, in this completely restored condition, the first cylinder chamber 13 and the brake fluid chamber 86 are completely refilled with brake fluid from the interior of the fluid reservoir 24, without even slight flow resistance to this refilling.

Although the first replenishing port 84 which connects the second cylinder chamber 14 to the reservoir 24 when the first piston member 9 is in its rightmost position is provided to open to the brake fluid chamber 86 which is freely connected to the fluid reservoir 24 only when the first piston member 9 is in its rightmost position as seen in the figure, in the shown embodiment, for convenience of design and construction, this replenishing port may be so arranged as to connect the second cylinder chamber 14 directly to the reservoir 24, as an alternative.

Further, in a per se conventional fashion, when the second piston member 10 has fully reached its restored position within the small cylinder bore 4, it displaces the valve rod stop 60 and the valve rod 59 to the right in the drawing, so as to open the valve 58, and so as to communicate the second hydraulic brake fluid reservoir 57, via the hole in the second mounting nut 56 and the second replenishing port 55, with the third fluid chamber 15, thereby, similarly, replenishing the third fluid chamber 15, and supplying additional hydraulic brake fluid thereto, to compensate for any slight leakage that may have occurred from the front braking system of the vehicle, or any under pressure which otherwise may exist in the third fluid chamber 15.

In the above described preferred embodiment of the present invention, the brake master cylinder device according to the present invention has been described as applied to one system only of a tandem master cylinder device, but the present invention is not limited to this application. In fact, the present invention might equally be applied to both systems of a tandem master cylinder device, for added efficiency. Further, the present invention could be applied to a single type master cylinder device, which supplied hydraulic pressure to both the front braking system of a vehicle, and to the rear braking system thereof. The essential concept of the present invention is the provision of the first and second fluid chambers 13 and 14, both of which are reduced in size as the first piston member moves due to application of force to the braking member of the vehicle by the driver thereof, with the one way valve comprising the sealing lip flange 32 of the sealing member 33 provided between these chambers, and the provision of the venting valve comprising the valve element 94, the conical compression coil spring 97, etc., as venting the first cylinder chamber, when the pressure therein reaches a certain predetermined pressure value.

Therefore, although the present invention has been shown and described in terms of a preferred embodiment thereof, and in language more or less specific with regard to structural features thereof, and with reference to the illustrative drawing, it should be understood that in any particular embodiment of the present invention various changes, modifications, and omissions of the form and the detail thereof could be made by a person skilled in the art, without departing from the essential scope of the invention. For example, it is not essential that the first and second cylinder chambers should be coaxial, nor that the end of the first cylinder chamber remote from the first piston should be defined by the other side of the second piston from the side thereof which defines the second cylinder chamber, as was the case in the shown embodiment; the first and second pressure chambers could be, for example, mounted side by side, and in that case the first piston would not be required to be larger in diameter than the second piston. All that is required, in the present invention, is that the motion of the first piston member, comprising the first and the second pistons, in a certain direction should reduce both the volume of the first and also of the second pressure chambers, together. Therefore, it is expressly desired that the scope of the present invention should be uniquely delimited by the legitimate and valid scope of the appended claims, which follow, and not by any of the perhaps purely fortuitous details of the shown embodiment, or of the drawing.

I claim:

1. A brake master cylinder device, comprising:
   (a) a body within which are formed a first cylinder bore and a second cylinder bore;
   (b) a first piston member, comprising a first piston engaged with said first cylinder bore and a second piston engaged with said second cylinder bore, a first cylinder chamber and a second cylinder chamber being, respectively, defined by the cooperation of said first piston with said first cylinder bore and by the cooperation of said second piston with said second cylinder bore, the displacement of said first piston member with respect to said body in a first direction tending to reduce the volume of said first cylinder chamber and also to reduce the volume of said second cylinder chamber;
   (c) a first means for biasing said first piston member in a direction opposite to said first direction with respect to said body;
   (d) a fluid reservoir for keeping fluid substantially at atmospheric pressure;
   (e) a fluid conduit opening from said second cylinder chamber for connection to a first brake actuator in order to supply operating fluid pressure thereto;
   (f) a first one way valve, which always allows fluid to flow substantially freely from said first cylinder chamber to said second cylinder chamber;
   (g) a second one way valve comprising a valve port, a valve element having a disk portion adapted to close said valve port and a stem portion axially aligned with said disk portion, and a spring which biases said disk portion toward said valve port, said second one way valve being adapted to allow fluid to flow substantially freely from said fluid reservoir to said first piston chamber when the pressure in said first cylinder chamber is below substantially atmospheric pressure and to allow fluid to flow substantially freely from said fluid reservoir to said first cylinder chamber and from said second cylinder chamber to said fluid reservoir when said disk portion of said valve element is tilted relative to said valve port by said stem portion being engaged with said first piston member displaced to its extreme position in said direction opposite to said first direction; and
   (h) venting means for venting said first cylinder chamber, comprising at least one vent port located near said valve port of said second one way valve, and an annular valve element having a central opening and adapted to close said vent port while allowing said valve port of said second one way valve to be unobstructed by said central opening being aligned therewith, and a spring for biasing said annular valve element to the position where it closes said vent port, said venting means being adapted to allow fluid to flow from said first cylinder chamber to said fluid reservoir when the fluid pressure in said first cylinder chamber rises to a predetermined fluid pressure value;
   (i) whereby, as said first piston member is displaced in said first direction from its extreme position in said direction opposite to said first direction, as the pressure within said fluid conduit and said second cylinder chamber rises so as to progressively operate said first brake actuator more and more, until the pressure in said first cylinder chamber reaches said predetermined pressure value, said pressure in said first cylinder chamber is substantially the same as that in said second cylinder chamber, said first one way valve allowing substantially free passage of fluid from said first cylinder chamber to said second cylinder chamber; and when the pressure in said first cylinder chamber reaches said predetermined fluid pressure value, said venting means operates, so as to vent said first cylinder chamber to said fluid reservoir, to prevent further rise of the pressure within said first cylinder chamber, the further rise of pressure within said second cylinder chamber being unaffected by the action of said venting means, and reverse flow of fluid from said second cylinder chamber to said first cylinder chamber being definitely always prevented except in the said extreme position of the second piston member;
   (j) whereby the pressure available in said fluid conduit, for a given amount of pressure exerted on said first piston member in said first direction, is higher in the latter period of operation of said master cylinder device, after said venting means has started to vent fluid to said fluid reservoir from said first cylinder chamber, than in the former period of operation of said master cylinder device, before said venting means has started to vent fluid to said fluid reservoir from said first cylinder chamber.

2. A brake master cylinder device according to claim 1, wherein: the diameter of said first cylinder bore and of said first piston is substantially larger than the diameter of said second cylinder bore and of said second piston; said first cylinder bore, said first piston, said second cylinder bore, and said second piston all being coaxial; one end of said first cylinder chamber is defined by one side of said first piston, and the other end of said first cylinder chamber is defined by one side of said second piston, the other side of said second piston defining one end of said second cylinder chamber, motion of said first piston member in said first direction moving said first piston towards said second cylinder bore; whereby, as said first piston member is moved in said first direction from its extreme position in said direction opposite to said first direction, the volume of said first cylinder chamber diminishes, according to the difference in cross sectional areas of said first piston and said second piston.

3. A brake master cylinder device according to claim 2, wherein said first one way valve comprises a seal member, comprising a disk shaped element mounted to said other side of said second piston and of substantially the same diameter as said second piston, and a flexible annular lip extending from the periphery of said disk shaped element in the direction away from said first cylinder chamber and bearing on the wall of said second cylinder bore; whereby fluid flow from said second cylinder chamber to said first cylinder chamber is positively prevented by said annular lip being pressed against the wall of said second cylinder bore by the presence of a higher fluid pressure in said second cylinder chamber than in said first cylinder chamber, but flow of fluid from said first cylinder chamber to said second cylinder chamber is allowed by said annular lip being deflected away from the wall of said second cylinder chamber by the presence of a higher pressure in said first cylinder chamber than in said second cylinder chamber.

4. A brake master cylinder device according to claim 1, further including means for releasing fluid from said second cylinder chamber comprising a port which connects said second cylinder chamber to said valve port of said second one way valve opened by the tilting of said disk portion of said valve element.

5. A brake master cylinder device according to claim 1, wherein said master cylinder body includes an aperture having a tapered opening in which said stem portion of said valve element is inserted, said tapered opening having the smallest cross sectional area at one end thereof closest to said disk portion of said valve element and the largest cross sectional area at the other end thereof.

6. A brake master cylinder device according to any one of claims 1, 2, 3, 4 or 5, further comprising a second piston member which is coaxial with and is mounted slidably in said second cylinder bore, one side of said second piston member and said other side of said second piston defining opposite ends of said second cylinder chamber, and wherein said second cylinder bore in cooperation with the other side of said second piston member defines a third cylinder chamber, said first biasing means being fitted between said second piston member and said first piston member and biasing them apart, and further comprising a second means for biasing said second piston member with respect to said body in the direction to enlarge the size of said third cylinder chamber and to decrease the size of said second cylinder chamber; said body being further formed with a second fluid conduit, for connection to a second brake actuator in order to supply operating fluid pressure thereto, which communicates with said third cylinder chamber, said second piston member being at equilibrium at an intermediate position in said second cylinder bore, under the actions of said first and second biasing means, when said first piston member is at its extreme position in the direction opposite to said first direction, said body being further formed with a second fluid channel for supplying fluid into said third cylinder chamber, and further comprising a second valve which is coupled to the movement of said second piston member so as to communicate said second channel and so as to supply fluid to said second cylinder chamber, only when said second piston member is substantially in said equilibrium position.

* * * * *